…

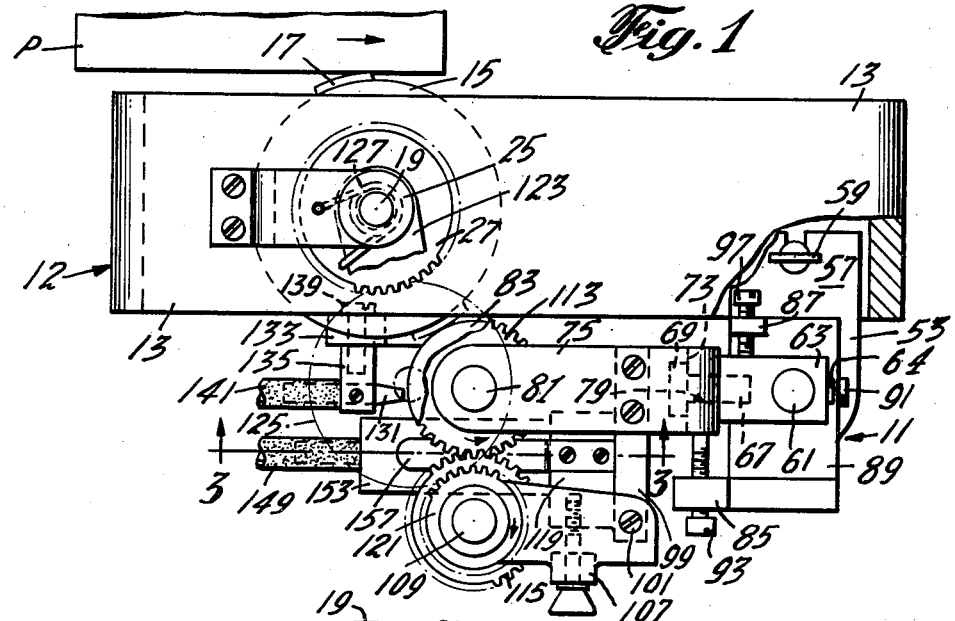
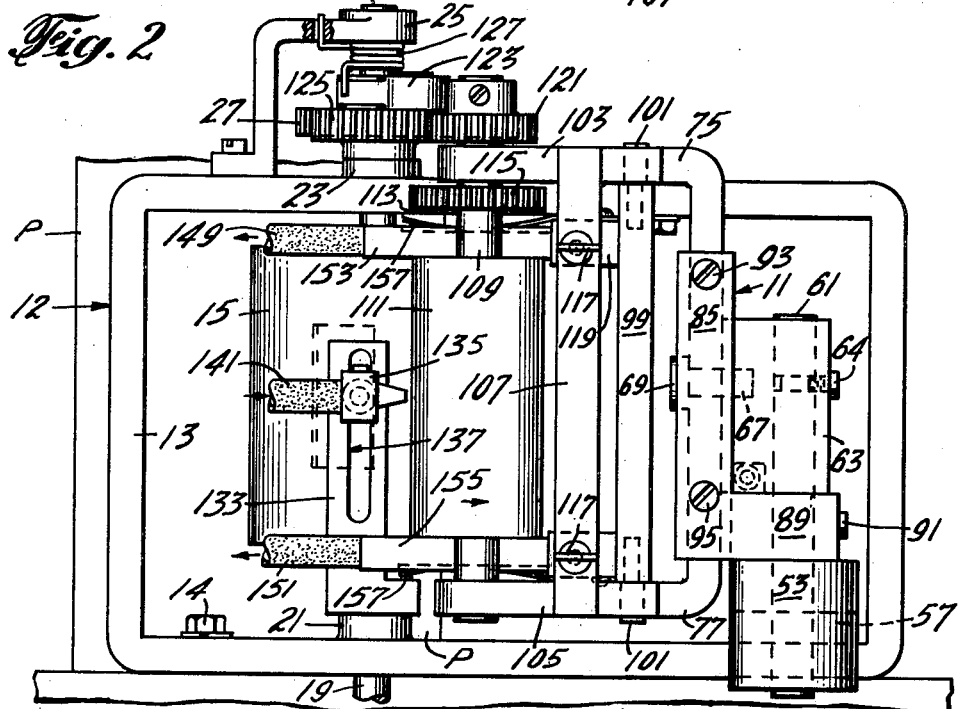

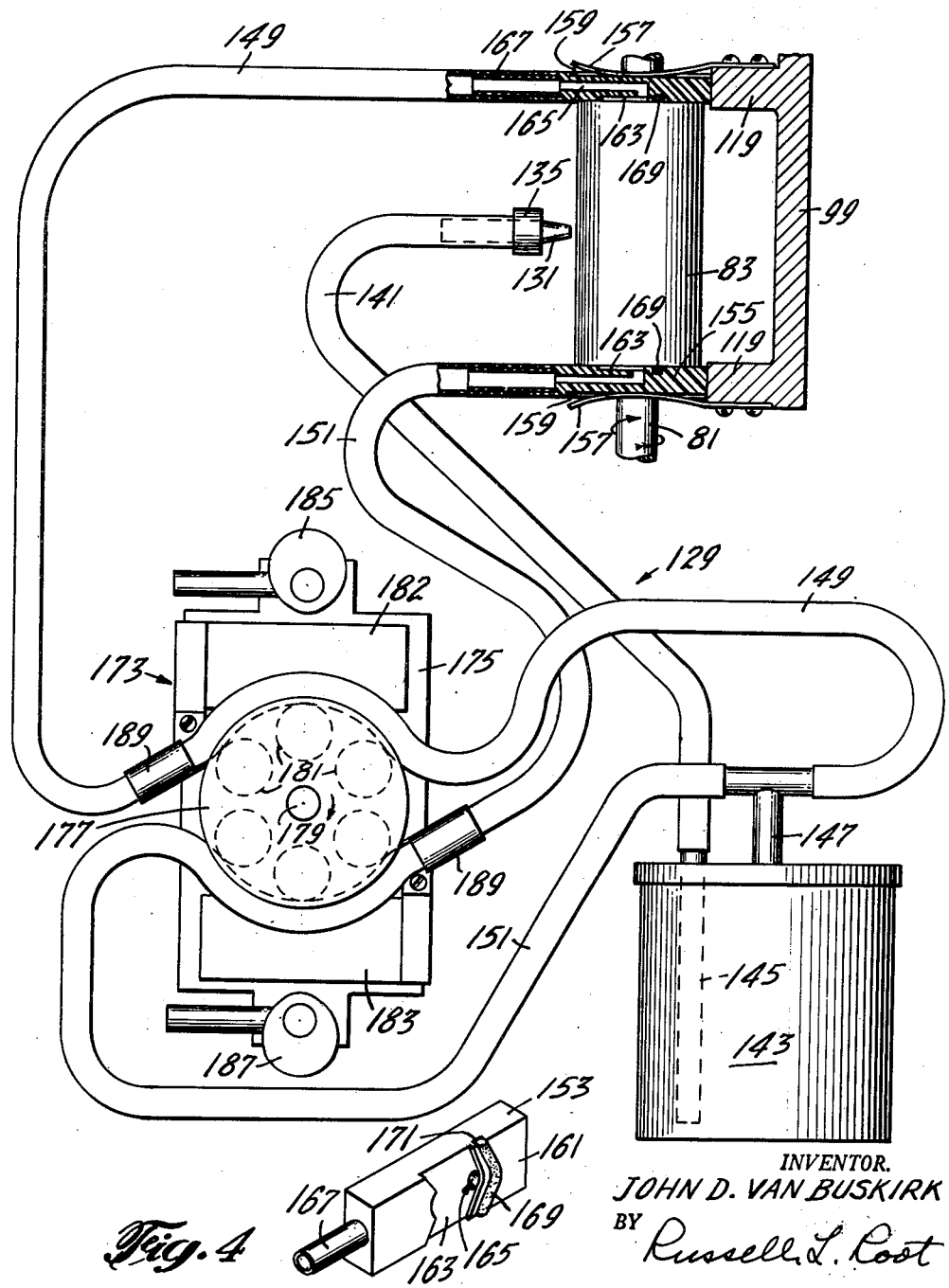

United States Patent Office 3,111,897
Patented Nov. 26, 1963

3,111,897
UNIVERSAL PASTE INKER FOR PRINTERS
John D. Van Buskirk, Fairfield, Conn., assignor to Van Buskirk & Company, Inc., a corporation of Connecticut
Filed Aug. 15, 1961, Ser. No. 131,585
16 Claims. (Cl. 101—350)

This invention relates to printing and especially to improved ink-handling means for printing machines.

Equipment for printing packages on their vertical surfaces was illustrated in my previous U.S. Patent No. 2,945,436, in which means was shown for supplying a particularly uniform film of liquid ink to a rotary printing member in spite of the vertical arrangement of its axis.

It has been found for many applications, however, that ink of rather stiffer consistency, for example, one having the properties of a soft paste with very slow flowing characteristics under the influence of gravity especially in thin films, gives much sharper and more commercially acceptable imprints.

Standard equipment for handling such paste inks in a roller printing application, however, is uniformly arranged to serve horizontal axis rollers, employing an open tank or fountain and a series of transfer rollers, one of which dips into the ink supply in the fountain.

It is accordingly an object of the present invention to provide improved paste inking equipment for a rotary printer in which the printing drum axis is vertically arranged.

Another object of the invention is the provision of a handling arrangement for paste ink which is equally adaptable to horizontal axis or vertical axis operation, readily convertible from one to the other, and which will also offer an improved operation from the standpoint of simplicity and tidiness as compared with standard fountain-type horizontal axis installations.

It has been found that the foregoing objects can be achieved by a novel structure in which the paste ink is withdrawn from a tank or reservoir by a pump and forced through a conduit to be expelled against the surface of a roller of the ink system.

It has also been discovered that the paste ink can be readily spread to a thin film by a simple two roller system with excess ink automatically expressed substantially equally at predetermined restricted localities at opposite ends of the rollers. Moreover a simple and convenient ink pick-up and suction arrangement has been devised for capturing all of said expressed excess ink and returning it in good condition to the reservoir.

In a preferred form of the equipment the ink return and ink supply make use of the same pumping system by the device of employing a sealed and pressurized ink reservoir.

Additional objects, features and advantages will appear hereinafter as the description proceeds.

In the drawing:

FIGURE 1 is a top plan of a printing head embodying the present invention with parts broken away to show detail structure.

FIG. 2 is an elevation of the device shown in FIG. 1 taken at the bottom of FIG. 1 and looking in an upwardly direction therein.

FIG. 3 is a diagrammatic view of the ink conduit and pumping system including as a part thereof a fragmentary section of the inking assembly taken substantially on line 3—3 of FIG. 1.

FIG. 4 is a detail perspective of one of the ink pick-up shoes.

Referring to the drawing, the inking assembly 11 of the invention is shown in connection with a printing head 12 of a machine for marking the sides of articles or packages P as the same are moved past the head 12 by suitable conveyor means (not shown). The head 12 includes a frame 13 suitably affixed to a base or machine frame as by screws 14, and a printing drum 15 in a substantially vertical position, and the surface of the drum is arranged to carry type 17 for making the required mark. The printing drum is arranged to be rotated continuously or intermittently in any suitable manner, and in the preferred form illustrated it is contemplated that the drum will be driven by power supplied via a drive shaft 19 either directly by mechanical connection with the conveyor which moves packages P, or by connection with some suitable source of auxiliary power designed to move the drum at a surface speed equal to that of packages P. In either case the shaft 19 rotates continuously at a predetermined speed (related to the printing speed of the printing drum) whenever the machine is operating. The particular connection of shaft 19 with its driving means, and the particular manner of control of the printing drum rotation from shaft 19, when intermittent, are omitted from the present disclosure since they form no part of the present invention.

The drive shaft 19 is supported for rotation in bearings 21, 23 and 25 and also drivingly carries an inker driving gear 27 for a purpose which will presently appear.

The inking assembly 11 includes a base element 53 which carries means such as a slotted ear 57 by which it can quickly be mounted on or released from the printing head frame 13, for example by the wing-head clamp screw 59. The base element further includes an upright post 61 which forms the support for the ink distributing system. The latter comprises a rockable member or swinging bracket 63, rockable in a horizontal plane about the axis of the post 61 upon which it may be suitably retained by detent screw 64. From one side of the bracket 63 projects a horizontal pin 67 having a retaining head 69. The pin 67 may be firmly anchored in the bracket 63 in any suitable manner, as by threading. A rigid vertical yoke 73 with horizontal arms 75 and 77 has a central opening 79 which receives the pin 67 and serves to rockably mount the yoke 73 on the same between the head 69 and the face of bracket 63.

The arms 75 and 77 of the yoke carry rotatably adjacent their free ends a shaft 81 carrying an ink depositing roller 83 with its axis substantially parallel to the axis of shaft 19. In order that precise parallelism may be provided between these axes and that the degree of inking pressure between the roller 83 and type 17 may be accurately set, brackets 85 and 87 are incorporated in the base element 53. In the particular arrangement shown, brackets 85 and 87 are integrally formed with a support 89 which surrounds post 61, is clamped thereto as by a setscrew 91, and incidentally serves as a rest surface for the swinging bracket 63. Bracket 85 threadedly carries two adjusting screws 93 and 95 acting against the yoke 73 at opposite sides of pin 67, by which the rocked position of yoke 73 about pin 67 may be determined. Of course, at the same time these settings determine a limit for the bodily swinging of bracket 63 (together with yoke 73) in a direction away from the printing drum, i.e. downwardly as viewed in FIG. 1. Bracket 87 carries an oppositely directed adjusting screw 97 bearing against the swinging bracket, serving as a stop against its swinging in an upwardly direction as seen in FIG. 1 and providing an adjustable reaction point against which the adjustment of screws 93 and 95 may take effect, and an abutment to prevent swinging of the yoke 73 towards the printing drum 15 at times when the type 17 is out of contact with inking roller 83.

Affixed between the arms 75 and 77 of the yoke 73 is a member 99 which forms a rigid lateral extension of the yoke. Pivotally mounted thereon, as by screws 101, 101, is a second or auxiliary yoke made up of arms 103, 105, and a tie member 107. The free ends of arms 103 and 105 rotatably support a shaft 109 carrying an ink spreading or doctor roller 111 which is, via yoke 103, 105, 107, held always parallel to inking roller 83. The roller shafts 81 and 109 also carry, with drive connections thereto, pinions 113 and 115 respectively. These pinions have pitch diameters identical with the respective roller diameters so as to be properly meshed when the rollers are in contact or when they are separated only by a thin ink film. Wing head screws 117, 117 pass freely through the tie member 107 of the auxiliary yoke and are threaded into suitable tie points fixed with respect to the main yoke, e.g. bosses 119, 119 properly positioned on the extension 99. Screws 117 serve to adjust the pressure between rollers 83 and 111 to accommodate various inking conditions including ink consistency.

The operation requires that rollers 83 and 115 be rotated in concert with each other and the printing drum 15, and it is found convenient to drive them from shaft 19 via the previously mentioned inker driving gear 27 thereon. To this end, one of the shafts 81, 109, in this case the shaft 109, carries a driven pinion 121 coplanar with gear 27. An arm 123 is mounted to swing freely about the axis of shaft 19, as by being pivoted thereon, and at its free end rotatably carries an idler pinion 125 of such diameter and so positioned as to be constantly in mesh with gear 27. Suitable means, e.g. torsion spring 127, is provided for urging arm 123 in a direction such that the idler 125 seeks to remain in mesh with the driven pinion 121, i.e. anticlockwise in FIG. 1. It will be noted that gear 27 is made smaller than the drum 15 to avoid contact with a package being marked, and the pitch diameter of gear 27 and pinion 121 are so related as to give equal surface speed to the printing drum 15 and inking rollers 83 and 111. Therefore, by means of the gear train 27, 125, 121, 115 and 113, the inking roller 83 and the doctor roller 111 are rotated together at uniform surface speeds at all times, and at the same surface speed as the printing drum 115 whenever the same is connected to the shaft 19 to be rotated thereby. Preferably rollers 83 and 111 have hard smooth surfaces, and in the form currently used they are of stainless steel, ground and polished.

An ink supplying system 129 is provided for getting ink from a storage point to the surface of inking roller 83, and is illustrated primarily in FIG. 3. A nozzle 131 is suitably mounted on the yoke 73, as by vertical arm 133 of the yoke and bracket 135. Preferably the bracket 135 is vertically adjustable on the arm 135 by reason of a vertical slot 137 through which passes a mounting and clamp screw 139 (FIGS. 1 and 2). The nozzle 131 is fed by a conduit 141, preferably a flexible plastic hose, which leads from a reservoir 143 and connects with a dip tube 145 therein which opens near the bottom of the reservoir for conveying ink in the reservoir to the nozzle 131 which discharges it on the surface of roller 83. The reservoir 143 is closed and sealed, and has an intake connection 147 by which unused ink can be returned to the reservoir and pressure on the ink supply can be exerted to force the ink through the conduit 141. This intake connection is preferably in the form of a T and connects with two flexible conduits 149 and 151. These conduits lead to a pair of collection shoes 153 and 155, respectively, which are held in close contact with the end surfaces of rollers 83 and 111 by suitable urging means such as leaf springs 157, 157 mounted on the previously described bosses 119 of lateral extension member 99. As can be seen from FIGS. 1 and 3 the arrangement is such that the directions of rotation of rollers 83 and 111 tend to move the shoes 153 and 155 endwise to the right by friction to a terminal position where they abut the bosses 119 to determine a proper running position. Their lateral position may be determined by arranging a locating groove 159 in the exposed surface of each shoe for reception of the leaf spring 157.

The collection shoes 153 and 155 are preferably of nylon or other tough, wear resistant material, and are the same in structure so that the shoe 153 will be described in detail with particular reference to FIG. 4, it being understood that these remarks apply also to shoe 155 in the same way. The working face 161 of the shoe has a transverse channel 163 which preferably has a slight V-shaped configuration, with the vertex so located as to lie substantially at the nip of the rollers 83, 111 when the shoe is in working position. Leading into the shoe from this apex, and thence lengthwise of the shoe 153 is a small ink passage 165. This passage leads to the end of the shoe and into a nipple 167 by means of which the shoe is connected to its conduit 149 or 151. In order to trap the ink and keep it from moving out of the effective range of the shoe there is, at that side of channel 163 towards which the rollers turn, a barrier or seal which is shown as consisting of a flexible resilient seal member 169 of circular cross section, such as a segment of an O-ring, seated and held by friction in a suitable groove 171 slightly shallower than the diameter of the seal member 169.

Means is provided for causing ink to be moved from the collection shoes 153, 155 towards the reservoir 143 and for pressurizing the reservoir. In the form shown this moving means is a peristaltic pump 173 which normally be affixed to the frame and which includes a pump frame 175, a rotor 177 on a shaft 179 rotatable on the frame 175 and driven by any suitable source of motive power (not shown). The rotor 177 carries an annular array of rollers 181 which cooperate with portions of the flexible conduits 149 and 151 to move the ink therethrough in a known manner. This cooperation is effected by slidable guide blocks 182 and 183 actuable respectively by cams 185 and 187 to squeeze the conduits 149 and 151 against the rollers 181 during pump operation or to release the conduits sufficiently to permit their withdrawal from the pump (the position shown in FIG. 3). Each conduit 149, and 151 preferably has affixed thereto a collar 189 designed to make contact with a portion of the pump frame to hold the conduit against possible lengthwise movement by the pump motion. It will be seen in FIG. 3 that the direction of rotation of rotor 177 is such as to feed ink (or air if no ink is available) from the shoes 153 and 155 towards the reservoir to return ink thereto and simultaneously pressurize the reservoir to cause feeding of ink via conduit 141 to nozzle 131 and roller 83 whenever the rotor 177 is turning.

In operation the reservoir is first charged with paste ink and the machine is started which applies rotary power to pump shaft 179 and drive shaft 19 thus causing rotation of rollers 83 and 111. Cams 185 and 187 are then thrown to close the arcuate guides 182 and 183 and cause pumping action to start, thereby applying air pressure to the reservoir and causing ink to be moved slowly but continuously through conduit 141 to nozzle 131 and onto the surface of roller 83. As the rollers 83 and 111 turn, the ink is spread in a uniform film over their surfaces, and the thickness of the film can be adjusted to the desired value by adjusting the roll pressure using wing screws 117. Any excess ink present forms a small bank at the roller nip and through the squeezing action of the rollers is moved endwise until it escapes at the roller ends at about the nip location. Here the collection shoes 153 and 155, by virtue of the suction action of pump 173, draw in the excess ink which is led via the conduits 149 and 151 back to the reservoir 143 to which it is returned via the T fitting 147 along with the pressurizing air. To stop the flow of ink at any time it is necessary merely to throw out the cams 185 and 187 and release the squeezing action of the guide surfaces 182 and 183.

With the ink being fed as above described, whenever the printing drum 15 is rotated by being connected to shaft 19, the type 17 thereon comes into rolling contact with the ink-bearing surface of roller 83 and is inked thereby, and then proceeds around to apply the desired mark to the surface of a package P which is being moved adjacent the printing head 12 as seen in FIG. 1.

Changing of ink systems, as in the case of color changes, is easily handled with the equipment of this invention. If it is desired to change colors extremely rapidly, all that is necessary is to loosen the screw 59, throw out cams 185 and 187 and remove the whole inking assembly 11, the reservoir 143 and the conduits connecting them from the printing head 12 and from the pump 173. The face of type 17 is then wiped clean and another system having a different color of ink can be installed instantaneously by reversing these steps. However by using just a very little more time, a rapid changeover can still be made even with only a single inking assembly 11 available. To do this the complete removal and type cleaning takes place as before. Nozzle 131 is released from bracket 135 and shoes 153 and 155 are slipped endwise out of place. Screws 117 are released and auxiliary yoke 103, 105, 107, is swung out so that both rollers 83 and 111 can be quickly wiped clean with ink solvent. A new ink supply system 129 having a different color is then installed by sliding its collection shoes 153, 155 into place between the roller ends and springs 157, 157. The new nozzle 131 is connected to the bracket 135, the rollers are repositioned by means of screws 117, 117, the inking assembly 11 is placed on the printing head and screw 59 is tightened, new conduits 149 and 151 are placed adjacent rollers 181 of pump 173, and the cams 185 and 187 are thrown in to move the guide surfaces 182 and 183 to squeezing position. The mechanism is then ready to operate with the new color.

While the foregoing description has proceeded primarily on the bases of providing inking means for a vertical axis printing drum, it can be readily realized that the features described are equally effective for use with a printing drum arranged on a horizontal or other axis, and such arrangements are contemplated within the purview of the present invention.

I claim:

1. A paste ink distribution system comprising an inking roller; an ink spreading roller rotatable in concert with and substantially in contact with said inking roller; a paste ink supply remote from said rollers; a nozzle for feeding ink against the surface of one of said rollers; a flexible conduit connecting said supply and said nozzle; means including a peristaltic pump for moving ink therethrough from said supply to said nozzle; and means for collecting ink expressed axially of said rollers and feeding the same to a remote collection point.

2. A paste ink distribution system comprising an inking roller; an ink spreading roller rotatable in concert with and substantially in contact with said inking roller to form a nip; a paste ink supply remote from said rollers; a nozzle for feeding ink against the surface of one of said rollers; first flexible conduit means connecting said supply and said nozzle; collection shoes pressed against the ends of said rollers at said nip; second flexible conduit means connecting said shoes and said supply; and peristaltic pump means acting on at least one of said conduit means to move ink through said conduit means towards said nozzle and away from said shoes.

3. A paste ink distribution system as set out in claim 2 in which said pump means is a single peristaltic pump providing ink moving power for both of said conduit means.

4. A paste ink distribution system as set out in claim 3 in which said second conduit means includes two branches, one leading from each collection shoe to said supply, and each of said branches is acted upon by said peristaltic pump.

5. A paste ink distribution system as set forth in claim 2 in which said supply is a tank whose top is sealed against access or escape of air except through said second conduit means, in which said first conduit means opens into the tank near the bottom, and in which the peristaltic pump means acts directly upon said second conduit means to move its contents from said shoes towards said supply tank.

6. In a printer, a frame; a printing drum rotatably mounted thereon; and an ink distribution system for inking type on said printing drum comprising an inking roller, a bracket rotatably supporting said roller, a quickly attachable and detachable mounting for said bracket on said frame, a portable ink supply remote from said roller, a flexible conduit mounted at one end on said bracket and connected at the other to said ink supply for conducting ink between said supply and said roller, and a peristaltic pump normally fixed in relation to said frame and coacting with said conduit to move ink therethrough, said pump being readily actuable between closed and open positions for operatively engaging said conduit during inking operation and for releasing said conduit for ready removal or exchange of ink distributing systems.

7. An ink circulating system comprising a sealed pressure-tight ink supply tank; a dip tube extending into the tank and opening at a point below ink level; an input connection into said tank; a conduit leading from said dip tube to an inking point; another conduit for carrying returning surplus ink from adjacent the inking point and connected to said input connection; and pump means associated with said other conduit for conveying any return ink to said tank therethrough and for simultaneously pressurizing said tank for causing dispensing of ink from said tank through said dip tube and via said first-mentioned conduit to said inking point.

8. An ink circulating system as set forth in claim 7 in which said other conduit is flexible, and said pump means is a peristaltic pump cooperating with said flexible conduit.

9. A paste ink distribution system comprising a pair of rollers forming a nip, said rollers being of substantially equal length and positioned to run with substantially coplanar ends; means to supply paste ink to the surface of one of said rollers; and means to collect excess ink expressed from the ends of the nip formed by said rollers comprising a pair of collection shoes, one at each end of said nip and each having a surface designed for surface contact with the ends of said rollers, and passage means formed in said shoes leading from a point adjacent the end of said nip to a conduit connection point.

10. A combination as set forth in claim 9 in which spring means is provided for urging each of said shoes into frictional engagement with the roller ends.

11. A combination as set forth in claim 10 in which said spring means is a leaf spring coacting with a groove in the surface of the shoe to insure correct lateral placement thereof.

12. A combination as set forth in claim 9 which includes abutment means disposed at one side of the rollers and so positioned as to intercept movement of the shoes in the direction inspired by roller friction at a point such that the terminus of the passage means is positioned closely adjacent the end of the nip.

13. A combination as set forth in claim 10 which includes abutment means disposed at one side of the rollers and so positioned as to intercept movement of the shoes in the direction inspired by roller friction at a point such that the terminus of the passage means is positioned closely adjacent the end of the nip.

14. A collection shoe for collecting excess paste ink expressed from the nip at the ends of a pair of ink distribution rollers, comprising a wear-resistant member of synthetic resin having a substantially flat face for frictionally engaging the end surfaces of the rollers; a shallow ink collection channel formed in said face and running generally athwart the direction of roller motion at the nip, and passage means providing a duct leading from said channel to a conduit connection point.

15. A collection shoe as set forth in claim 14 in which the junction of said duct with said channel is located at a side of said channel from which the ink distribution rollers are moving away during operation.

16. A collection shoe as set forth in claim 15 in which there is also provided a resilient seal member in the flat face along that side of the channel from which the ink distribution rollers are moving away during operation.

References Cited in the file of this patent

UNITED STATES PATENTS

| | | |
|---|---|---|
| 2,614,492 | Brodie | Oct. 21, 1952 |
| 2,818,016 | Alessi | Dec. 31, 1957 |

FOREIGN PATENTS

| | | |
|---|---|---|
| 494,347 | Italy | May 19, 1954 |